United States Patent
Leppänen et al.

(10) Patent No.: US 12,007,349 B2
(45) Date of Patent: Jun. 11, 2024

(54) FAST HUMIDITY SENSOR AND A METHOD FOR CALIBRATING THE FAST HUMIDITY SENSOR

(71) Applicant: Vaisala Oyj, Vantaa (FI)

(72) Inventors: Jukka Leppänen, Helsinki (FI); Marko Jalonen, Vantaa (FI)

(73) Assignee: Vaisala Oyj, Vantaa (FI)

( * ) Notice: Subject to any disclaimer, the term of this patent is extended or adjusted under 35 U.S.C. 154(b) by 0 days.

(21) Appl. No.: 17/545,029

(22) Filed: Dec. 8, 2021

(65) Prior Publication Data

US 2022/0178862 A1 Jun. 9, 2022

(30) Foreign Application Priority Data

Dec. 9, 2020 (EP) .................................... 20397517

(51) Int. Cl.
*G01N 27/22* (2006.01)
(52) U.S. Cl.
CPC ................... *G01N 27/225* (2013.01)
(58) Field of Classification Search
CPC ... G01N 27/223; G01N 27/225; G01N 27/228
See application file for complete search history.

(56) References Cited

U.S. PATENT DOCUMENTS

| | | | | |
|---|---|---|---|---|
| 5,296,819 A * | 3/1994 | Kuroiwa | ............... | G01N 27/225 73/335.04 |
| 6,564,633 B2 * | 5/2003 | Stormbom | ............ | G01N 27/223 73/29.02 |
| 9,513,242 B2 * | 12/2016 | Beck | ..................... | G01N 27/225 |
| 9,588,073 B2 * | 3/2017 | Feyh | ..................... | G01N 27/121 |
| 2007/0273394 A1 | 11/2007 | Tanner et al. | | |
| 2019/0195820 A1 * | 6/2019 | Fornasari | ............. | G01N 27/223 |
| 2019/0257780 A1 * | 8/2019 | Le Neel | .................. | H01L 25/50 |
| 2020/0150072 A1 * | 5/2020 | Bez | ....................... | G01N 27/223 |

FOREIGN PATENT DOCUMENTS

| | | | |
|---|---|---|---|
| DE | 3911812 A1 | 10/1990 | |
| DE | 102016115004 A1 | 2/2018 | |
| JP | H08184575 A * | 7/1996 | |
| JP | H08292202 A | 11/1996 | |
| JP | H09119913 A | 5/1997 | |
| JP | 2001201478 A | 7/2001 | |
| JP | 2002156348 A | 5/2002 | |
| JP | 2006234576 A | 9/2006 | |
| JP | 2006527356 A | 11/2006 | |
| JP | 2018136134 A | 8/2018 | |
| KR | 102035089 B1 * | 10/2019 | ........... G01N 27/223 |

OTHER PUBLICATIONS

English Translation of DE 102016115004 A1 (original presented by the applicant) (Year: 2018).*
Machine translation for JP 2002-156348 (Year: 2002).*

* cited by examiner

*Primary Examiner* — Judy Nguyen
*Assistant Examiner* — James Split
(74) *Attorney, Agent, or Firm* — Laine IP Oy

(57) ABSTRACT

According to an example aspect of the present invention, there is provided a sensor structure formed on a substrate comprising a sensor frame, comprising electric contacts for sensors, an active sensor within the sensor frame comprising at least a capacitive humidity sensor. In accordance with the invention the active sensor is connected to the sensor frame only by a thin thermally isolating layer supporting the active sensor, the thermally isolating layer including electric contacts from the sensor frame.

14 Claims, 2 Drawing Sheets

FAST HUMIDITY SENSOR AND A METHOD FOR CALIBRATING THE FAST HUMIDITY SENSOR

FIELD

This invention relates to humidity sensors and methods for calibrating humidity sensors.

BACKGROUND

Capacitive humidity sensors have been used in the prior art for decades. These sensors have been calibrated using heatable elements like resistors in order to obtain zero point humidity measurement value for calibration purposes. However, due to the slowness of the humidity sensor response time, no real zero point humidity calibration has been achieved by these known methods.

SUMMARY OF THE INVENTION

The invention is defined by the features of the independent claims. Some specific embodiments are defined in the dependent claims.

According to a first aspect of the present invention, there is provided a heatable humidity sensor, in which the humidity measurement capacitor and resistive heating and measuring elements are thermally insulated from the rest of the sensor structure.

According to a second aspect of the present invention, there is provided a sensor structure where the sensor frame and the active sensor are concentric with each other.

According to a third aspect of the present invention, there is provided a sensor structure where the total width of the support bridges represent around 0.5-75% of the circumference of the active sensor.

According to a fourth aspect of the present invention, there is provided a sensor structure where the total thickness of the active sensor is in the range of 1-100 µm, typically around 2 µm.

According to a fifth aspect of the present invention, there is provided a sensor structure where the thickness of layer supporting the active sensor is 100-1000 nm, typically 350 nm.

According to a sixth aspect of the present invention, there is provided a sensor structure where the heating power for the active sensor is in the range of 0.1 mW/° C. . . . 5 mW/° C.

According to a seventh aspect of the present invention, there is provided a sensor structure where the rate of temperature change during heating of the active sensor (22) is typically more than 200° C./s.

According to a eighth aspect of the present invention, there is provided a sensor structure where the length of each of the support bridge to the width of the active sensor is typically in the range of 1:6-1:2, preferably around 1:4.

According to a ninth aspect of the present invention, there is provided a sensor structure where the thermal response time of the active sensor is more than 10 times, preferably more than 20 times shorter than humidity response time of the active sensor.

According to a tenth aspect of the present invention, there is provided a calibration method for the sensor structure where at least a minimum value for the capacitance is determined as a RH 0% point.

EMBODIMENTS

With the sensor structure in accordance with the invention a low thermal mass is achieved for the active sensing area and therefore fast thermal response. As a consequence, also the needed heating power is low. Therefore, the calibration methods based on heating are possible also in ATEX-classified environments, where there is a risk of explosion.

The fast thermal response makes it possible to develop and use of enhanced autocalibration methods. With the same sensor structure also accurate temperature measurement by the same sensor element is possible, if the sensor heating is used. With prior art solutions a separate temperature measuring element is required for temperature measurement because the high heating power would cause self heating problems in an integrated system.

Figure 1:
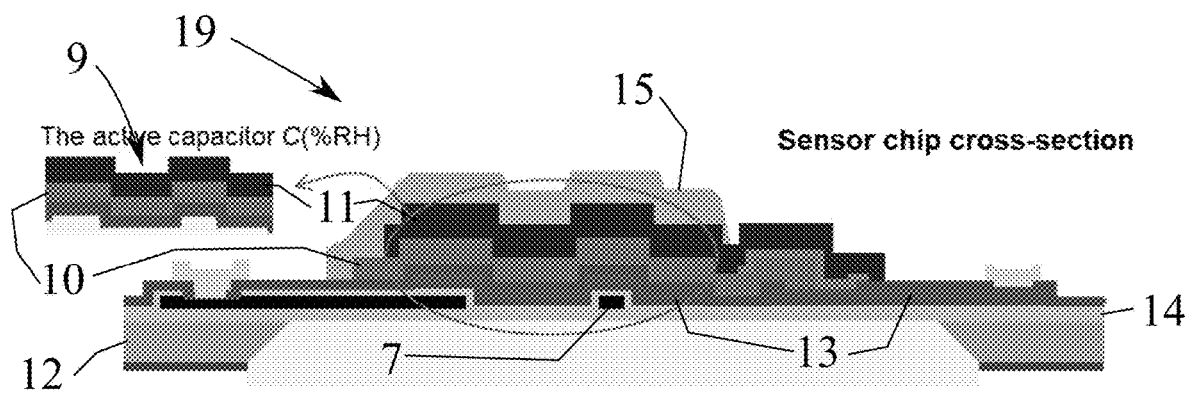
FIG. 1 illustrates as a cross section sensor structure in accordance with at least some embodiments of the present invention.

In FIG. 1 is presented a cross section of a humidity sensor structure 19 in accordance with the present invention. On a silicon substrate 12 is formed a LPCVD-nitride layer 14, which acts also as a support layer for the actual capacitor 9 formed by niobium electrode 13, active polymer layer 10 and upper porous chromium electrode 11. The substrate may also be of germanium. The thermally isolating layer 14 is in one preferred embodiment of the invention a uniform structure. The heating resistor 7 (or alternatively temperature sensor 8) is located inside the LPCVD-nitride layer 14. The humidity measurement capacitor 9 is protected by a protection polymer layer 15 on the top.

Figure 2:
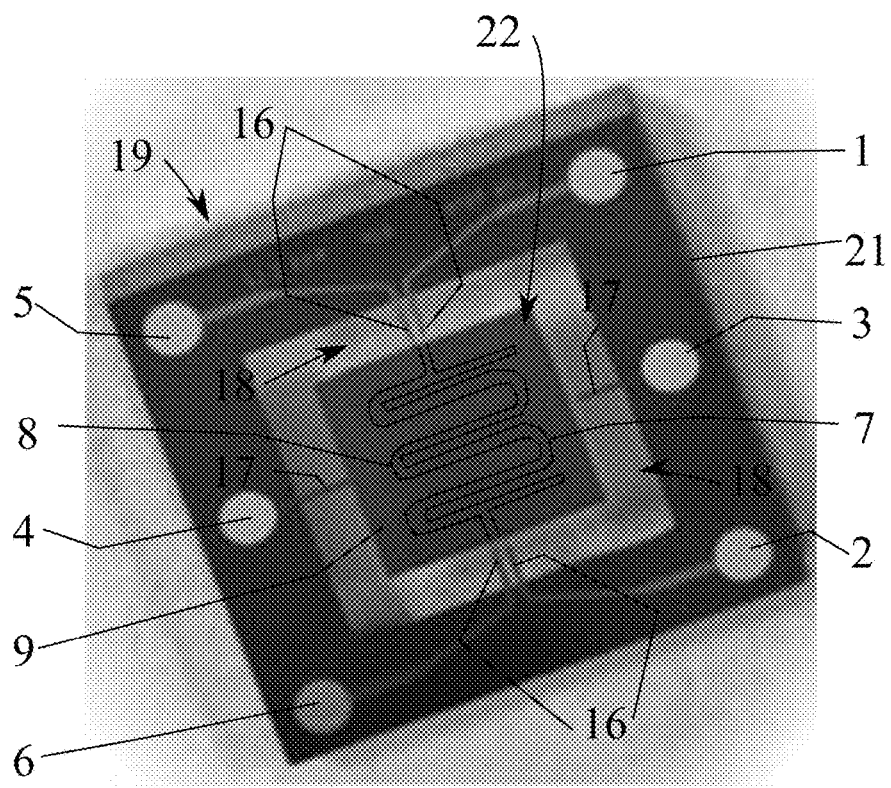
FIG. 2 illustrates as a top view another sensor structure in accordance with at least some embodiments of the present invention.
Figure 3:
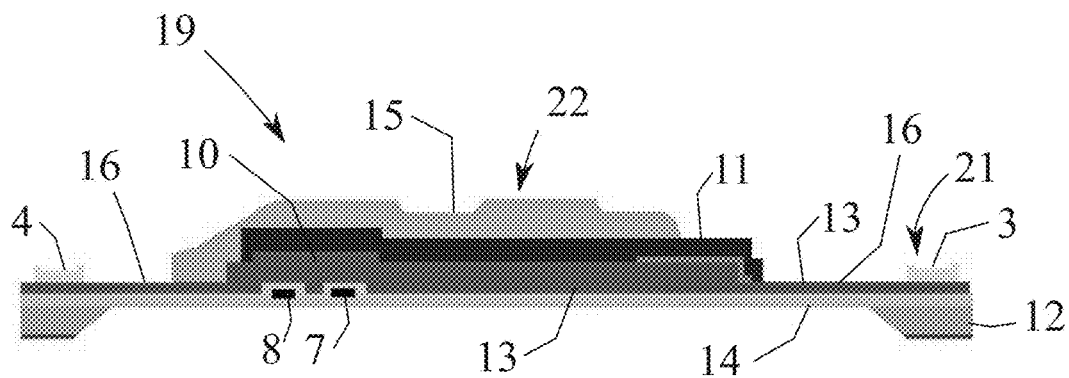
FIG. 3 illustrates as a cross section a sensor structure in accordance with FIG. 3 along pads 3 and 4.

In accordance with FIGS. 2 and 3 the sensor structure comprises two main elements, an active sensor 22 surrounded by a sensor frame 21. The sensor frame 21 is formed on a silicon substrate 12. The active sensor 22 is mechanically connected to the sensor frame 23 only by a thin thermally isolating layer 14 supporting the active sensor 22, the layer 14 including electric contacts from the sensor frame 21. In one embodiment of the invention the layer 14 includes isolation gaps 18 such that the active sensor 22 is contacted to the sensor frame by thin support bridges 16 and 17 of the thermally isolating layer 14, covered by Niobium for electric contacts. The length of each of the support bridges is around 0.5 mm, typically in the range of 0.1-1 mm and the ratio of the length of each of the support bridges 16, 17 to the width of the active sensor 22 is around 1:4, typically in the range of 1:6-1:2. By these isolation gaps 18 additional thermal insulation is created between the active sensor 22 and the sensor frame 21. The active sensor 22 typically includes a planar humidity measurement capacitor 9 and at least one of heating resistor 7 and temperature sensor 8 or both. The sensor frame 21 contains the contact pads 1 and 2 for the heating resistor 7, humidity measurement capacitor 9 contact pads 3 and 4 and temperature sensor 8 contact pads 5 and 6. The total width of the support bridges 16 and 17 represent around 0.5-75% of the circumference of the active sensor 22 and by this structure the active sensor is efficiently thermally isolated from the sensor frame 21. The active sensor 22 is also very thin, around 2 µm, typically in the range of 1-100 µm and the supporting LPCVD-nitride layer 14 around 350 nm thick, the thickness being typically in the range of 100-1000 nm. The thermally isolating layer 14 may also be formed of several sublayers, however the total thermal insulation of the layer 14 has to be sufficient.

The most significant difference with the prior art solutions is that with the present invention a true dry capacitance can be measured. In the prior art solutions, the dry capacitance has never been reached but only assumed by extrapolation. This method is not accurate because the temperature dependence changes due to aging and therefore is one of the biggest error sources in the present humidity sensors.

Figure 4:
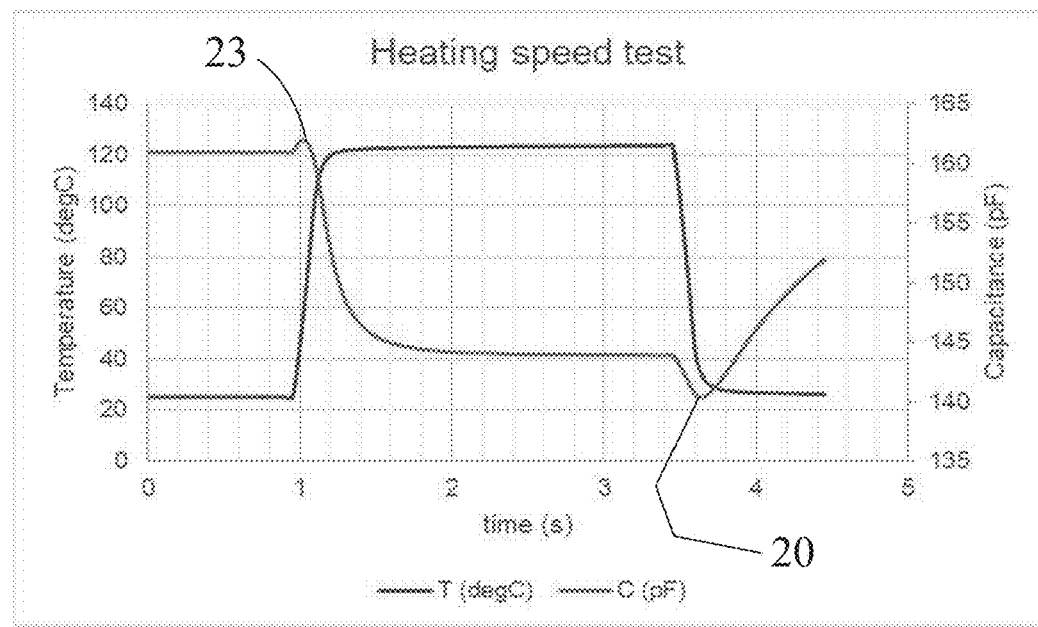
FIG. 4 illustrates as a graph a calibration method in accordance with at least some embodiments of the present invention.

With the above described invention a big difference between response times is achieved in humidity and temperature measurements required by the dry capacitance measurement. Typically, the response time for humidity measurement is more than 10 times longer than the response time for temperature measurement. In FIG. 4 presented graphically the capacitance of the humidity sensor 9 and the temperature of the same element measured by the temperature sensor as a function of time during a heating pulse. The elevated temperature in the curve represents the heating pulse. The capacitance minimum 20 represents the dry capacitance because at that point due to the very fast (=short) response time of the temperature measurement the temperature of the active sensor 22 is at the ambient temperature (or other desired temperature for the dry calibration) but no water has yet absorbed to the humidity sensor 9. In other words, at point 20 the humidity sensor is at RH 0% and in measurement temperature.

Typical characteristics for the active sensor structure 22 are the following:
the heating power may be in the range of 0.1 mW/° C. . . . 5 mW/° C.
the rate of temperature change is typically more than 200° C./s.
the used temperature range is typically in the range of 5-300° C.

The structure in accordance with the invention makes it possible to use additional methods with fast temperature changes. In the capacitance curve 23 represents the point where the water has not been removed from the sensor 9 due heating but the temperature has reached a stable value. With this calibration point the temperature dependence of the humidity sensor 9 may be determined.

As examples in the following some features of the present invention are listed:
Capacitance of capacitor 9 changes as molecules absorb into dielectric material and measured capacitance correlates with the concentration of substance.
The temperature of the capacitor 9 is measured by a temperature dependent resistor 8.
The capacitor 9 can be heated by separate heater resistor 7 or alternatively by periodically powering or measuring temperature measurement resistor 8.
The capacitor 9 dielectric material 10 might be organic polymer, ceramic or any other dielectric material which can absorb molecules.
Self-sustaining thin film 14 can be SiN.
Resistor 7, 8 materials can be platinum, molybdenum or other monotonically for temperature change responding material.

The capacitor 9, temperature measurement 8 and heating elements 7 are placed so that they can considered to be an island 22 on low thermal conducting self-sustaining film 14 (FIG. 2, central area). Metal leads in purpose to made electrical contacts are so thin that they do not have essential affect to thermal conductivity. Electrical contact pads 1-6 are on the surrounding sensor frame 21 formed of Si substrate 12.

The sensor structure described in the text above combined with a fast temperature change by heating only low thermal mass area 22 where capacitor 9 is placed it is possible to use novel drift compensation method. With this method we can measure dry capacitance in the actual measurement temperature. The prior art methods could only predict dry capacitance by using calculations and assumptions of thermal dependency of dry capacitance. Now it is possible to measure the dry capacitance as thermal response time is about 20 times faster than humidity response time. At the elevated temperature practically all water is desorbed from the sensor and during the fast cooling period water has no time to absorb in to the sensor hence measured capacitance indicates only dry capacitance of the sensor 9. Dry capacitance drift can then be compensated. Other benefit is very fast autocalibration cycle and short locking time for reading.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", i.e. a singular form, throughout this document does not exclude a plurality.

INDUSTRIAL APPLICABILITY

The invention is industrially applicable

ACRONYMS LIST

RH Relative humidity
LPCVD Low pressure chemical vapor deposition
PECVD Plasma-enhanced chemical vapor deposition

REFERENCE SIGNS LIST 1 first heating resistance contact pad
2 second heating resistance contact pad
3 first humidity measurement capacitor contact pad
4 second humidity measurement capacitor contact pad
5 first temperature sensor contact pad
6 second temperature sensor contact pad
7 heating resistor
8 temperature sensor
9 humidity measurement capacitor, capacitive humidity sensor
10 active polymer of humidity measurement capacitor
11 upper, porous electrode of the humidity measurement capacitor
12 Substrate of silicon or germanium
13 lower electrode of humidity measurement capacitor
14 LPCVD-nitride layer (support), thermally isolating layer
15 Protection polymer
16 resistor conductor support bridge
17 capacitor conductor support bridge
18 isolation gap
19 sensor structure
20 RH 0% point
21 sensor frame
22 active sensor
23 RH max point

The invention claimed is:

1. A calibration method using a sensor structure formed on a substrate comprising a sensor frame comprising electric contacts for sensors and an active sensor within the sensor frame comprising at least a capacitive humidity sensor, wherein the active sensor is mechanically attached to the sensor frame only by a thermally isolating layer supporting the active sensor, the thermally isolating layer supporting the electric contacts, the substrate is removed from the active sensor, the active sensor includes at least one of a heating resistor and a temperature measurement resistor, and, wherein:
the active sensor is heated with a heating pulse, and
the capacitance of the capacitive humidity sensor and temperature of the active sensor are determined in connection with the heating pulse, wherein
the sensor structure is configured to produce a difference between a thermal response time and a humidity response time of the active sensor, wherein the difference is utilized for dry capacitance measurement, and
the temperature of the capacitive humidity sensor is measured by the temperature measurement resistor, and
at least a minimum value for the capacitance, which represents a dry capacitance, is determined as a RH 0% point of the humidity sensor at the measurement temperature, and
a RH maximum point during the heating pulse, which represents the point where water has not been removed from the humidity sensor due to heating but the temperature has reached a stable value, is determined in connection with the heating pulse.

2. The calibration method in accordance with claim 1, wherein the duration of the heating pulse is in the range of 0.05-5 seconds.

3. The calibration method in accordance with claim 1, wherein the heating power for the active sensor is in the range of 0.1 mW/° C. to 5 mW/° C.

4. The calibration method in accordance with claim 1, wherein the rate of temperature change during heating of the active sensor is more than 200° C./s.

5. The calibration method in accordance with claim 1, wherein the thickness of the thermally isolating layer supporting the active sensor is 350 nm.

6. The calibration method in accordance with claim 1, wherein the thickness of the thermally isolating layer supporting the active sensor is 100-1000 nm.

7. The calibration method in accordance with claim 1, wherein the capacitive humidity sensor is heated by the heating resistor or by periodically powering or measuring a second temperature measurement resistor.

8. The calibration method in accordance with claim 1, wherein the active sensor includes the heating resistor and the temperature measurement resistor, and the thermal response time of the active sensor is more than 10 times faster than the humidity response time of the active sensor.

9. The calibration method in accordance with claim 1, wherein the sensor frame and the active sensor are concentric with each other.

10. The calibration method in accordance with claim 1, wherein the total thickness of the active sensor is in the range of 1-100 µm.

11. The calibration method in accordance with claim 1, wherein the total thickness of the active sensor is 2 µm.

12. The calibration method in accordance with claim 1, wherein the width of the thermally isolating layer between the sensor frame and the active sensor to the width of the active sensor is in the range of 1:6-1:2.

13. The calibration method in accordance with claim 1, wherein the substrate is of one of: silicon or germanium.

14. The calibration method in accordance with claim 1, wherein the thermally isolating layer is of SiN.

* * * * *